(12) United States Patent
Wettlaufer

(10) Patent No.: US 7,571,595 B2
(45) Date of Patent: Aug. 11, 2009

(54) CHAIN LINK OVERLAY AND METHOD OF IMPROVING CHAIN LINK AESTHETICS

(76) Inventor: Eric Wettlaufer, 518 Virginia Ave., Port Orange, FL (US) 32127

( * ) Notice: Subject to any disclaimer, the term of this patent is extended or adjusted under 35 U.S.C. 154(b) by 0 days.

(21) Appl. No.: 11/584,376

(22) Filed: Oct. 20, 2006

(65) Prior Publication Data

US 2008/0010964 A1    Jan. 17, 2008

Related U.S. Application Data

(60) Provisional application No. 60/830,799, filed on Jul. 14, 2006.

(51) Int. Cl.
  *F16G 13/02* (2006.01)
(52) U.S. Cl. .................... 59/93; 59/78; 59/84; 474/207; 474/226
(58) Field of Classification Search ............... 59/78, 59/84, 93, 3, 4, 5; 474/207, 226; 198/189, 198/850, 851
  See application file for complete search history.

(56) References Cited

U.S. PATENT DOCUMENTS

| | | | |
|---|---|---|---|
| 1,344,365 A | | 6/1920 | Wachenheimer |
| 2,422,844 A | | 6/1947 | Mullaney |
| 2,915,909 A | | 12/1959 | Boron |
| 2,954,113 A | * | 9/1960 | Hibbard et al. ........ 198/867.15 |
| 3,646,752 A | | 3/1972 | Kampfer |
| 3,739,571 A | | 6/1973 | Lashar, Jr. |
| 3,974,640 A | | 8/1976 | Schreyer |
| 4,301,915 A | * | 11/1981 | Michalik et al. ............ 198/851 |
| 4,411,131 A | | 10/1983 | Ohnishi et al. |
| 4,690,665 A | * | 9/1987 | Oliver et al. ................. 474/245 |
| 4,978,327 A | * | 12/1990 | Wu .................................. 59/4 |
| 5,042,244 A | * | 8/1991 | Worsley ........................ 59/78 |
| 5,125,140 A | * | 6/1992 | Sticht ....................... 198/860.2 |
| 5,199,197 A | | 4/1993 | Thuerman |
| 5,249,415 A | * | 10/1993 | Frenker-Hackfort ........ 59/78.1 |
| 5,363,640 A | * | 11/1994 | Schick ........................... 59/80 |
| 5,502,962 A | * | 4/1996 | Butti .............................. 59/80 |
| 6,105,356 A | | 8/2000 | Capstick et al. |
| 6,141,892 A | * | 11/2000 | Moore et al. ..................... 59/4 |

(Continued)

OTHER PUBLICATIONS

PCT/US2007/015339, Jan. 22, 2009, Notification Concerning Transmittal of International Preliminary Report.

(Continued)

*Primary Examiner*—David B Jones
(74) *Attorney, Agent, or Firm*—Paul S. Rooy

(57) ABSTRACT

A chain link overlay and method of improving chain link aesthetics. The chain link overlay is designed to be permanently attached to a chain link. The overlay has an overlay front side with adornment, coloration, art work, or embossment, and also an overlay rear side which is intended to be attached to a chain link. The overlay rear side includes a pin head bore corresponding to each pin head extending from the chain link. When the overlay is attached to the chain link, each pin head extending from the chain link is disposed within a pin head bore. The overlay may be attached to the chain link with adhesive, solder, welding, or any other appropriate means of attachment. The overlay front side may feature artwork, coloration, decoration, and/or embossments, to increase the aesthetic appeal of a chain link to which the chain link overlay has been attached.

13 Claims, 4 Drawing Sheets

U.S. PATENT DOCUMENTS

| | | | |
|---|---|---|---|
| 6,308,510 B1 | 10/2001 | Christmas | |
| 6,318,064 B2 * | 11/2001 | Vandini | 59/80 |
| 6,494,030 B2 * | 12/2002 | Cazard | 59/80 |
| 6,662,545 B1 * | 12/2003 | Yoshida | 59/78 |
| 7,043,895 B2 * | 5/2006 | Mace | 59/80 |
| 7,201,687 B2 * | 4/2007 | Mott et al. | 59/5 |

OTHER PUBLICATIONS

PCT/US2007/015339, Jan. 14, 2009, International Preliminary Report on Patentability.

PCT/US2007/015339, Sep. 5, 2008, Written Opinion of the International Searching Authority.

* cited by examiner

CHAIN LINK OVERLAY AND METHOD OF IMPROVING CHAIN LINK AESTHETICS

Claim for Priority: This utility patent application is based upon and claims the benefit of the earlier filing date of U.S. provisional patent application Serl. No. 60/830,799 filed Jul. 14, 2006 entitled Chain Link Overlay.

BACKGROUND OF THE INVENTION

1. Field of the Invention

This invention relates to chains links, and in particular to a chain link overlay and method of improving chain link aesthetics.

2. Background of the Invention

Motorcycles comprise an important part of our transportation system, and have been around for over a century. Gottlieb Daimler, a German engineer, is generally credited with inventing and building the first motorcycle in 1885. He mounted a four-stroke piston engine to a wooden bicycle frame. Following a few decades of development, the motorcycle became a reliable, useful vehicle during the early 1900's.

While today's motorcycles do not differ significantly in appearance from the early models, they do incorporate important improvements. Modern motorcycles have stronger frames, more powerful engines and more dependable brakes. Larger, softer seats make riding more comfortable, and hydraulic springs help lessen road shocks.

The drive system used in most current motorcycles consists of a chain driven by the engine, which in turn drives a sprocket attached to the rear wheel. See FIGS. 1-3. The chains themselves are typically rather mundane, consisting of a series of link 4 pairs rotatably attached at pins 12. Engine and rear wheel sprockets are sized to accept bushing 8 between adjacent teeth, and links 4 prevent chain 2 from sliding off the sprockets laterally.

Large motorcycle shows have developed around the country during the last century, where hundreds of thousands of bike aficionados and their bikes congregate. Examples of these include Daytona Beach, Fla., Laconia N.H., and Sturgis, S. Dak. Participants pay special attention to the exterior appearance of each other's motorcycles. Thus, the aesthetic appeal of motorcycles has became very important.

All aspects of motorcycles are typically scrutinized: wheels, engines, gas tanks, fairings, sound accessories, saddlebags, intercoms, even sidecars and trailers if present. Only the chains themselves have been traditionally ignored, and these retain the same appearance they did 100 years ago: oily links attached via equally oily pins—not very aesthetically pleasing. Accordingly, it would desirable to provide an aesthetically attractive chain link overly which can be attached to a link of an existing chain, which could be attached to links of a motorcycle drive chain, to a bicycle or tricycle drive chain, or to any other chain whose aesthetics is sought to be improved.

SUMMARY OF THE INVENTION

Accordingly, it is an object of the present invention to provide a way of improving the external appearance of chains. Design features allowing this object to be accomplished include an overlay having a pin head bore corresponding to each pin head over which the overlay is to be placed. An advantage associated with the accomplishment of this object is the improved aesthetic appeal of the chain.

It is another object of the present invention to provide an overlay which may be installed on an existing chain. Design features allowing this object to be accomplished include an overlay having a pin head bore corresponding to each pin head over which the overlay is to be placed. A benefit associated with the accomplishment of this object is the ability to install the overlay on an existing chain, along with the associated cost savings of not having to purchase a new chain.

It is yet another object of this invention to provide an overlay which can be manufactured and installed on existing chains at a modest price. Design features allowing this object to be achieved include the use of components made of readily available materials. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Four sheets of drawings are provided. Sheet one contains FIG. 1. Sheet two contains FIGS. 2 and 3. Sheet three contains FIGS. 4, 5 and 6. Sheet four contains FIGS. 7 and 8.

DETAILED DESCRIPTION OF THE PREFERRED EMBODIMENT

Figure 1:
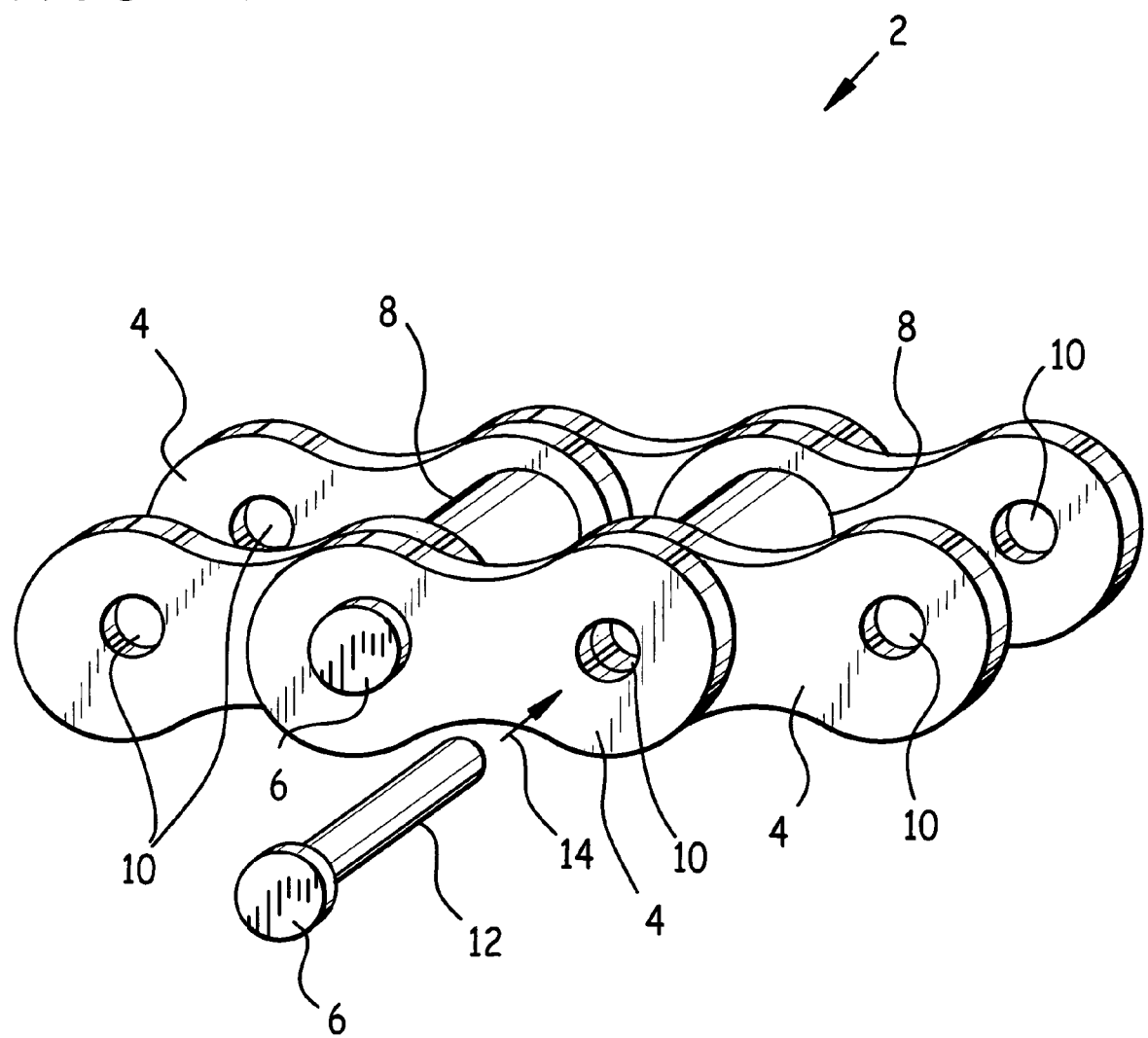
FIG. 1 is a front isometric view of a prior art chain.
Figure 2:
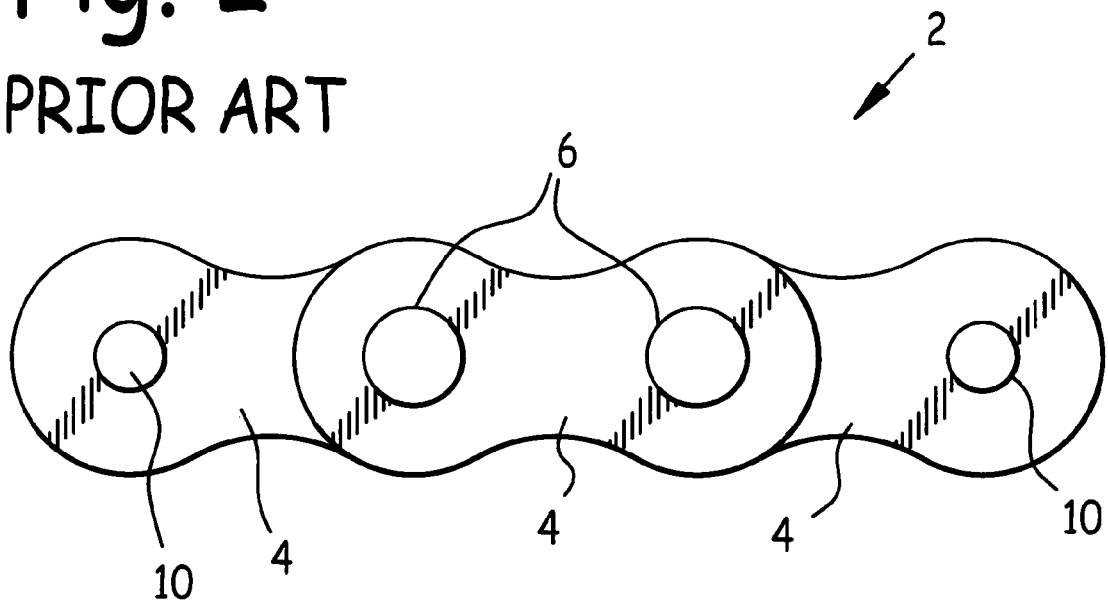
FIG. 2 is a front view of a prior art chain.
Figure 3:
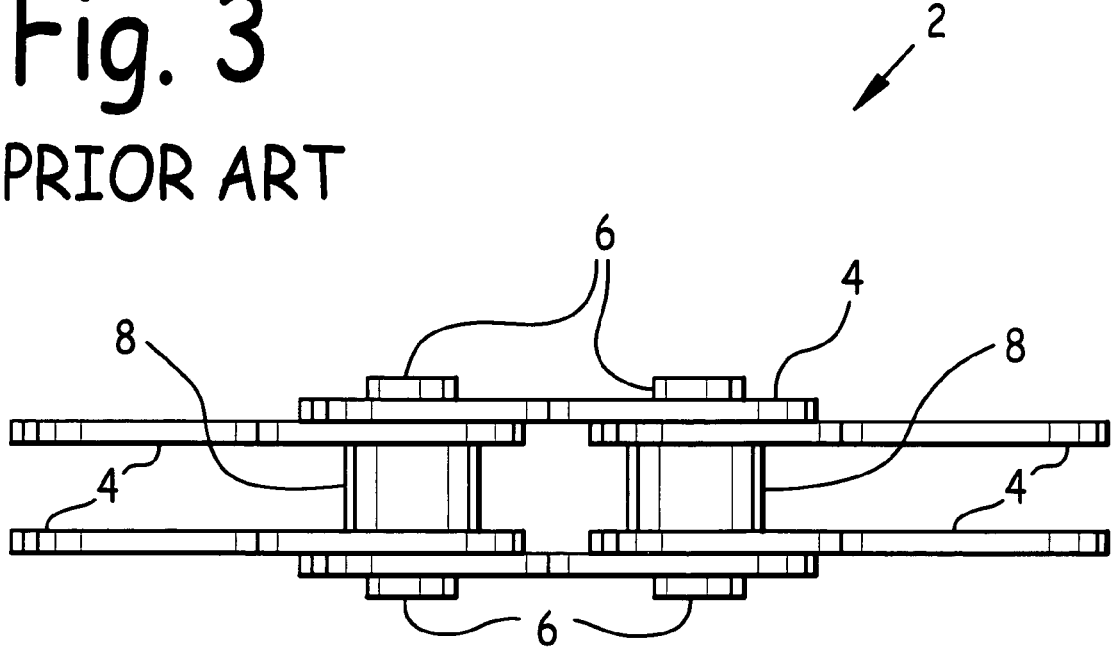
FIG. 3 is a top view of a prior art chain.

FIG. 1 is a front isometric view of prior art chain 2. FIG. 2 is a front view of prior art chain 2. FIG. 3 is a top view of prior art chain 2. As may be observed in these figures, chain 2 comprises two lines of partially overlapping links 4. Pins 12 through pin bores 10 rotatably attach adjacent links 4. Each pin 12 termites at both ends in a pin head 6 of diameter greater that pin bore 10.

When chain 2 is assembled, pins 12 are inserted into pin bores 10 pertaining to one line of partially overlapping links 4 as indicated by arrow 14 in FIG. 1. Then each pin 12 is inserted through a bushing 8, and thence through pin bores 10 pertaining to the other line of partially overlapping links 4.

The chain 2 illustrated in the instant figures is a drive chain such as may be used in bicycles, motorcycles, tricycles, etc. Bushings 8 are sized to fit into sprockets on the vehicle in question, and thus chain 2 may be used to drive one or more wheels of the vehicle.

Although drive chains are old and well-known in the art, and have thoroughly proven their utility, their appearance is somewhat mundane, and not very aesthetically pleasing. Thus, it would be desirable to "dress up" drive chains, especially in the field of motorcycles and motorized tricycles.

Figure 4:
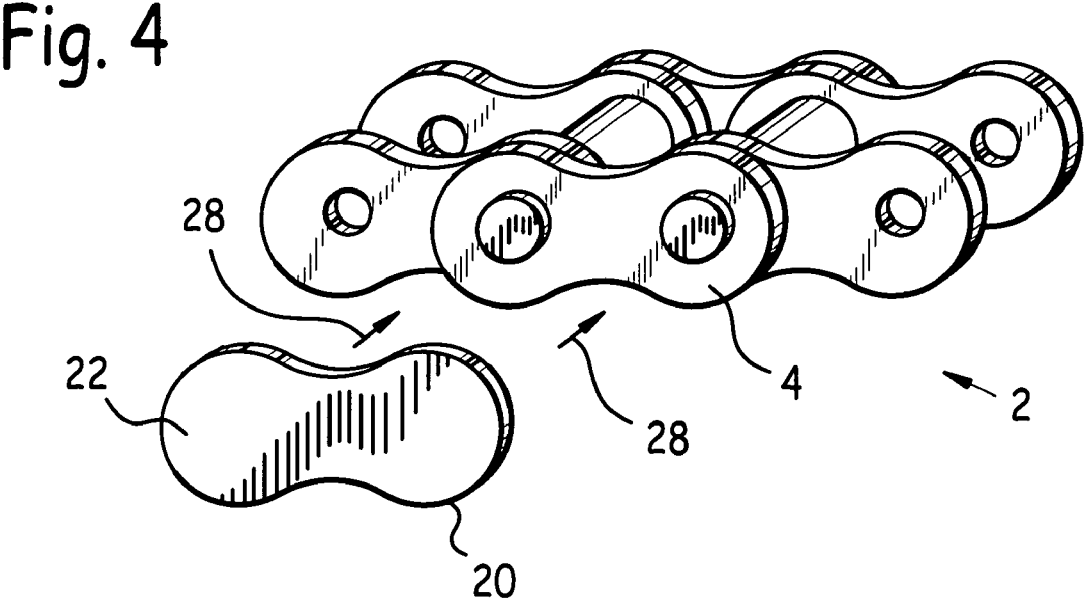
FIG. 4 is a front isometric view of an overlay about to be installed on a chain link.
Figure 5:
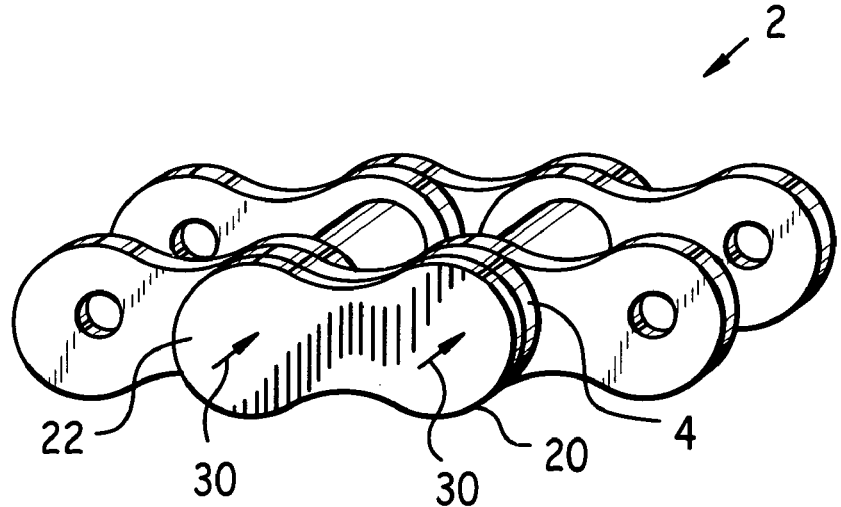
FIG. 5 is a front isometric view of an overlay installed on a chain link.
Figure 6:
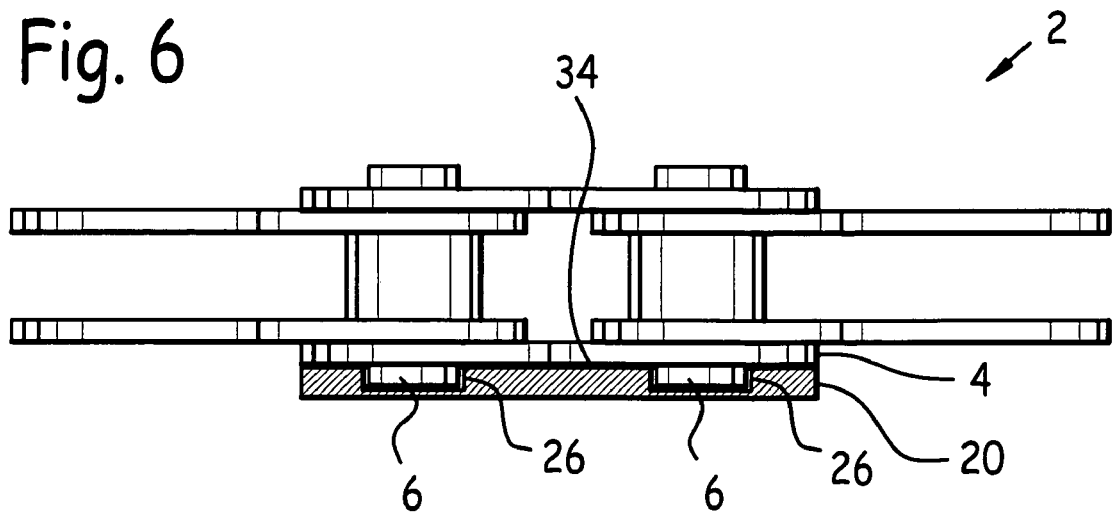
FIG. 6 is a top cut-away view of an overlay installed on a chain link.

Accordingly, overlay 20 is herein disclosed, which may be attached to an existing chain link 4. FIG. 4 is a front isometric view of an overlay 20 about to be installed on a chain link 4 as indicated by arrows 28. FIG. 5 is a front isometric view of an overlay 20 installed on a chain link 4 as indicated by arrows 30. FIG. 6 is a cut-away view of an overlay 20 installed on a chain link 4, depicting pin heads 6 disposed within pin head bores 26. Each pin head bore 26 is located and sized to admit a corresponding pin head 6 over which overlay 20 is to be installed. Thus, overlay 20 contains one pin head bore 26 corresponding to each pin head 6 over which overlay 20 is to be installed.

Figure 7:
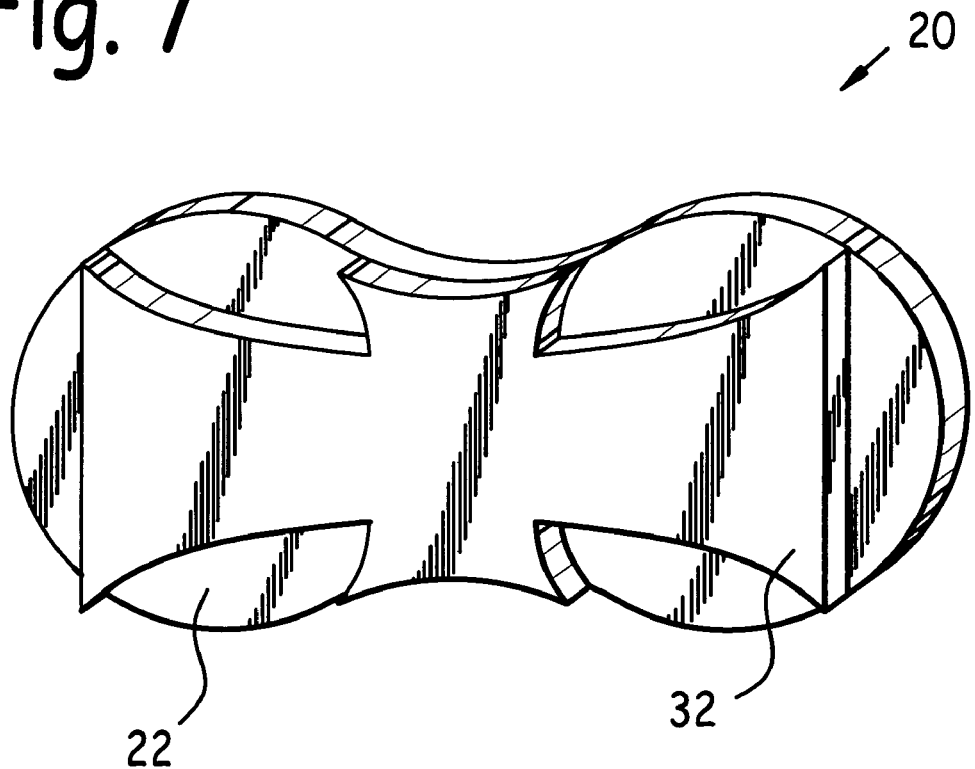
FIG. 7 is a front isometric view of an overlay with cruciform embossment.
Figure 8:
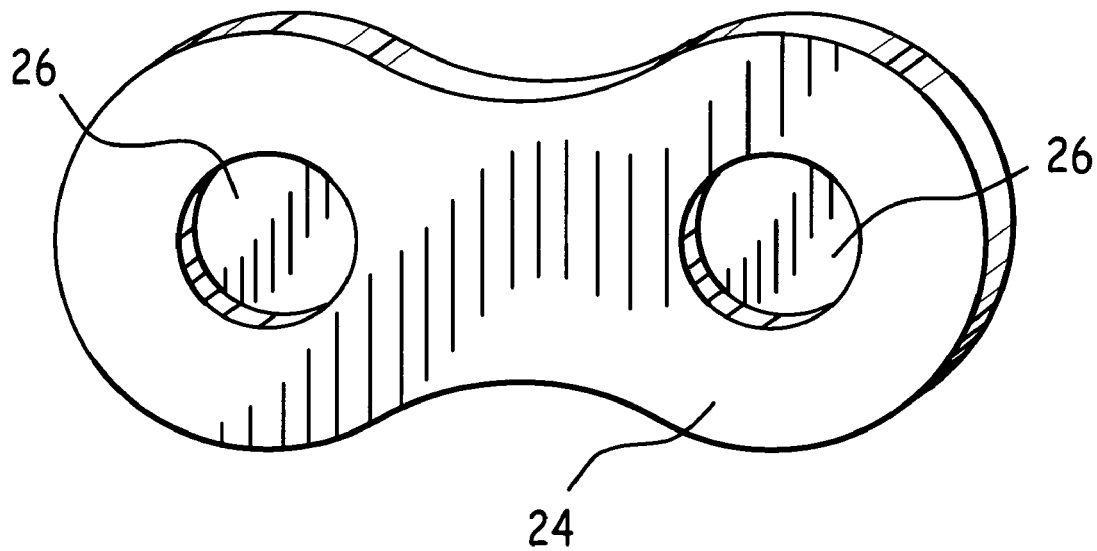
FIG. 8 is a rear isometric view of an overly with pin head bores.

FIG. 7 is a front isometric view of an overlay 20 with cruciform embossment 32. FIG. 8 is a rear isometric view of overly 20 with pin head bores 26.

As may be observed in these figures, overlay 20 comprises overlay front side 22, overlay rear side 24, and at least one pin head bore 26 in overlay rear side 24. In the preferred embodiment, overlay 20 comprised one pin head bore 26 corresponding to each pin head 6 over which overlay 20 was to lie when attached to a chain link 4. As may be observed in FIGS. 4-6, pin head bore(s) 26 may be blind bores, that is to say pin head bore(s) 26 may not extend completely through chain overlay 20.

In the preferred embodiment, the plan view shape of overlay 20 substantially co-extended with the plan view shape of a link 4 to which overlay 20 was attached. Overlay 20 may be attached to a link 4 by any appropriate means, including but not limited to adhesive 34 with or without primer, welding, soldering, cold welding, etc. For example, one type of adhesive with primer which has been found to be effective in attaching overlay 20 to link 4 has been acrylic adhesive, for instance Hernon® ReAct™ 727, described in the attached *Technical Data Sheet ReAct™ 727* (January 2006, 3 pages), which is hereby incorporated hereinto by reference.

As may be observed in FIGS. 1, 3, 4 and 6, pin heads 6 extend beyond the surface of link 4. In order for overlay 20 to lie flush against link 4, it is necessary to provide link 4 with a pin head bore 26 sized to admit a pin head 6 for each pin head 6 over which overlay 20 will lie. In most cases there are two pin heads 6 over which overlay 20 will lie, thus necessitating two pin head bores 26 in overlay 20. The pin head bores 26 in overlay 20 must each be sized to admit a pin head 6, and also must be properly located on overlay rear side 24 such that each pin head 6 projecting beyond a link 4 will project into a corresponding pin head bore 26 when overlay 20 is installed on that link 4. While in the preferred embodiment, pin head 6 and pin head bore 26 were substantially round in cross-section, it is intended to fall within the scope of this disclosure that pin head 6 and pin head bore 26 be any appropriate size and shape. For the purposes of the functionality of overlay 20 it is only desirable that pin head bore 26 admit pin head 6, such that overlay 20 may lay flush against a chain link 4 upon which it is installed.

Thus, in the preferred embodiment, the plan view shape of overlay 20 substantially co-extends with the plan view shape of a link 4 to which overlay 20 is to be attached. A pin head bore 26 is manufactured into overlay rear side 24 corresponding to each pin head 6 over which overlay 20 is to lie when installed on link 4. Then overlay 20 is attached to link 4, using one of the previously described means of attachment. Some attachment means may require preparation of link 4 and/or overlay rear side 24 prior to actual attachment, such as cleaning, roughening of the attachment surface, etching, priming, etc.

According to one method of installation, overlay 20 is attached to link 4 by means of adhesive 34 and adhesive primer. First overlay rear side 24 and the surface of a corresponding link 4 to which overlay 20 is to be attached are cleaned and roughened with sand paper, a file, sandblasting, or any other appropriate method of roughening.

Then one surface to be attached (either overlay rear side 24, or the surface of a corresponding link 4 to which overlay 20 is to be attached) is coated with adhesive 34, and the other surface to be attached is coated with primer. Next, within the time limit specified by the adhesive manufacturer, overlay 20 and link 4 are bonded together by joining together the surface to be attached which is coated with adhesive 34 into contact with the surface to be attached which is coated with primer. Finally, the overlay 20 and link 4 may be clamped together as necessary, and the adhesive 34 allowed to cure per the instructions of the adhesive manufacturer.

As may be observed in FIGS. 5 and 6, once overlay 20 is attached to link 4, overlay 20 may substantially co-extend with link 4, and each pin head 6 is disposed within a corresponding pin head bore 26 in overlay rear side 24. Although in the preferred embodiment the plan view shape of overlay 20 substantially co-extends with the plan view shape of a link 4 to which overlay 20 is to be attached, it is contemplated to fall within the scope of this disclosure that any shape or size overlay 20 may be employed.

A principal purpose of attachment of the instant overlays 20 to chain links 4 is improvement of the aesthetics of a chain 2. To this end, overlay front side 22 may be decorated and/or colored as desired. Successive overlays 20 may be colored the same, or colored so as to produce color patterns when chain 2 is moving as in driving a wheel. Fluorescent and/or reflective materials may be used, as well as embossments such as is illustrated in FIG. 7. In addition, overlay 20 may be shaped to represent naturally occurring or imaginary figures, symbols or shapes, as desired by the manufacturer.

FIG. 7 depicts a cruciform embossment 32 on overlay front side 22. It is contemplated to fall within the scope of this disclosure that any appropriate embossment, coloration, decoration, overlay shape, and art work be incorporated into overlay 20, limited only by the imagination of the manufacturer.

Thus, the instant method of improving chain link aesthetic appeal comprises the steps of:

A. Providing a chain link from which at least one pin head extends;
B. Providing an overlay comprising an overlay rear side, with a pinhead bore in the overlay rear side corresponding to each pin head the overlay will lie over when installed on the chain link;
C. Attaching the overlay to the chain link.

The instant method of improving chain link aesthetic appeal may comprise the step cleaning and roughening the overlay rear side and a chain link surface, applying a coating of adhesive primer to the roughened overlay rear side or to the roughened chain link surface, applying adhesive to the other roughened surface, and holding the roughened overlay rear side in contact with the link roughened surface.

The instant method of improving chain link aesthetic appeal may comprise the step of manufacturing the overlay to incorporate an embossment to further enhance the aesthetic appeal of the link.

The instant method of improving chain link aesthetic appeal may comprise the step of manufacturing the overlay to incorporate color(s) and/or shape(s) to further enhance the aesthetic appeal of the link.

The instant method of improving chain link aesthetic appeal may comprise the steps of manufacturing the overlay to substantially co-extend with the chain link when the overlay is installed on the chain link.

In the preferred embodiment, overlay 20 was made of steel, aluminum, other metal, plastic, synthetic, wood, or other appropriate material. Overlay 20 was attached to link 4 by means of acrylic adhesive with or without primer, other appropriate adhesive, welding, soldering, cold welding, or any other appropriate attachment means.

While a preferred embodiment of the invention has been illustrated herein, it is to be understood that changes and variations may be made by those skilled in the art without departing from the spirit of the appending claims.

DRAWING ITEM INDEX 2 chain
4 link
6 pin head
8 bushing
10 pin bore
12 pin
14 arrow
20 overlay
22 overlay front side
24 overlay rear side
26 pin head bore
28 arrow
30 arrow
32 embossment
34 adhesive

I claim:

1. In combination, a chain link and a chain link overlay, said chain link overlay comprising an overlay front side and an overlay rear side, and at least one pin head bore in said overlay rear side, said chain link comprising at least one pin head extending from said chain link, said chain link overlay rear side being attached to said chain link, each said at least one pin head bore being sized and located to admit said one said pin head, one said pin head being disposed within each said at least one pin head bore, said chain link overlay substantially co-extending with said chain link.

2. The chain link overlay of claim 1 wherein said overlay rear side comprises two pin head bores, each said pin head bore being sized and placed so as to admit a pin head extending from said chain link, one said pin head being disposed within each said pin head bore.

3. In combination, a chain link overlay and a chain link, said chain link overlay comprising an overlay front side and an overlay rear side, and two blind pin head bores in said overlay rear side, said overlay rear side being attached to said chain link, two pin heads extending from said chain link, each said pin head bore being sized and located so as to admit one said pin head, one said pin head being disposed within each said pin head bore, said chain link overlay substantially co-extending with said chain link.

4. In combination, a chain link overlay and a chain link, said chain link overlay comprising an overlay front side and an overlay rear side, and at least one pin head blind bore in said overlay rear side, said overlay rear side being attached to said chain link with adhesive, at least one pin head extending from said chain link, each said at least one pin head bore being sized and located so as to admit one said pin head, one said pin head being disposed within each said pin head bore, said chain link overlay substantially co-extending with said chain link.

5. The chain link overlay of claim 4 wherein said overlay rear side comprises two pin head bores, each said pin head bore being sized and placed so as to admit a pin head extending from said chain link, one said pin head being disposed within each said pin head bore.

6. The chain link overlay of claim 5 wherein said overlay front side comprises adornment, coloring, or art work.

7. The chain link overlay of claim 5 wherein said overlay front side comprises an embossment.

8. A method of improving chain link aesthetic appeal comprising the steps of:
   A. Providing a chain link from which at least one pin head extends;
   B. Providing an overlay comprising an overlay rear side with a pinhead bore in said overlay rear side corresponding to each said pin head said overlay will lie over when installed on said chain link, said chain link overlay substantially co-extending with said chain link;
   C. Attaching said overlay to said chain link such that each said at least one pin head is disposed within a corresponding said pin head bore.

9. The method of improving chain link aesthetic appeal of claim 8 comprising the further step cleaning and roughening said overlay rear side and a chain link surface prior to applying adhesive, and subsequently applying adhesive to said overlay rear side and/or said chain link surface.

10. The method of improving chain link aesthetic appeal of claim 9 comprising the further step of placing a coating of adhesive primer on the roughened overlay rear side or on the roughened chain link surface.

11. The method of improving chain link aesthetic appeal of claim 8 comprising the further step of manufacturing said overlay to incorporate an embossment to further enhance the aesthetic appeal of said link.

12. The method of improving chain link aesthetic appeal of claim 8 comprising the further step of manufacturing said overlay to incorporate at least one color and/or at least one shape to further enhance the aesthetic appeal of the link.

13. The method of improving chain link aesthetic appeal of claim 8 comprising the further step of manufacturing said overlay to substantially co-extend with said chain link when said overlay is installed on said chain link.

* * * * *